(12) United States Patent
Chen

(10) Patent No.: US 8,469,580 B2
(45) Date of Patent: Jun. 25, 2013

(54) EDGE-LIGHTING TYPE BACKLIGHT MODULE

(75) Inventor: Peng-Fang Chen, Hsinchu (TW)

(73) Assignee: Young & Lighting Technology Corporation, Hsin-chu (TW)

( * ) Notice: Subject to any disclaimer, the term of this patent is extended or adjusted under 35 U.S.C. 154(b) by 59 days.

(21) Appl. No.: 12/981,195

(22) Filed: Dec. 29, 2010

(65) Prior Publication Data

US 2011/0170315 A1 Jul. 14, 2011

(30) Foreign Application Priority Data

Jan. 13, 2010 (TW) .............................. 99100756 A

(51) Int. Cl.
*F21V 7/04* (2006.01)
(52) U.S. Cl.
USPC ............ 362/632; 362/612; 362/623; 362/634
(58) Field of Classification Search
USPC ................................................ 362/600–634
See application file for complete search history.

(56) References Cited

U.S. PATENT DOCUMENTS

| 7,452,121 | B2 * | 11/2008 | Cho et al. ...................... 362/633 |
| 8,113,706 | B2 * | 2/2012 | Lin ................................ 362/633 |
| 2007/0041212 | A1 | 2/2007 | Cho et al. |

FOREIGN PATENT DOCUMENTS

| TW | 200516316 | 11/2003 |
| TW | M288395 | 9/2005 |
| TW | 200702814 A | 1/2007 |
| TW | M351370 | 7/2008 |
| TW | 200835967 A | 9/2008 |
| TW | M361858 | 7/2009 |

OTHER PUBLICATIONS

Taiwan Office Action for corresponding English Translation Application dated Mar. 19, 2013 with English Translation.

* cited by examiner

*Primary Examiner* — Sean Gramling
(74) *Attorney, Agent, or Firm* — Muncy, Geissler, Olds & Lowe, PLLC

(57) ABSTRACT

An edge-lighting type backlight module includes a light guide plate, a light source module, a back plate, a thermal conductive element, and a thermal insulating element. The light guide plate has a light-emitting surface, a bottom surface opposite the light-emitting surface, and at least one side surface connected between the light-emitting surface and the bottom surface. The light source module is disposed adjacent to the side surface, and the back plate is disposed adjacent to the bottom surface. The thermal conductive element has a base portion touching the light source module and an extension portion extending to one side of the back plate. The thermal insulating element is connected between the back plate and the thermal conductive element to reduce the heat conduction between the light source module and the back plate.

10 Claims, 4 Drawing Sheets

EDGE-LIGHTING TYPE BACKLIGHT MODULE

BACKGROUND OF THE INVENTION a. Field of the Invention

The invention relates to an edge-lighting type backlight module.

b. Description of the Related Art

FIG. 4 shows a schematic diagram of a conventional edge-lighting type backlight module. Referring to FIG. 4, the edge-lighting type backlight module 100 includes a light guide plate 102, a light source module 104, and a back plate 106. The light source module 104 is disposed inside the back plate 106, and the heat generated by the light source module 104 is directly conducted to the back plate 106 and then gradually dissipated in the atmosphere. Beside, fin structures 108 are formed on an outer side of the back plate 106 to increase heat-dissipating areas. However, in the above design, the heat is gradually dissipated in the atmosphere through the back plate 106, the back plate 106 with large size is liable to twist or deform as a result of a thermal stress caused by non-uniform temperature distribution, and hence poor optical performance is given. Accordingly, some designs are proposed to solve this problem. For example, Taiwan patent publication No. 200516316 discloses a backlight module, wherein a thermal insulating spacer is disposed between a mask and an optical film to prevent the heat generated by a light-emitting device from transferring to the optical film. Besides, Taiwan patent No. M351370 discloses a backlight module, wherein an air gap exists between a reflective sheet and a back plate to prevent the heat generated by a light-emitting device from transferring to the reflective sheet or an optical film set.

However, the above designs fail to both provide good heat-dissipation efficiency and prevent heat from transferring to the back plate.

BRIEF SUMMARY OF THE INVENTION

The invention provides an edge-lighting type backlight module capable of providing good heat-dissipation efficiency and preventing heat from transferring to a back plate.

Other objects and advantages of the invention may be further illustrated by the technical features broadly embodied and described as follows.

In order to achieve one or a portion of or all of the objects or other objects, one embodiment of the invention provides an edge-lighting type backlight module. The edge-lighting type backlight module includes a light guide plate, a light source module, a back plate, a thermal conductive element, and a thermal insulating element. The light guide plate has a light-emitting surface, a bottom surface opposite the light-emitting surface, and at least one side surface connected between the light-emitting surface and the bottom surface. The light source module is disposed adjacent to the side surface, and the back plate is disposed adjacent to the bottom surface. The thermal conductive element has a base portion touching the light source module and an extension portion extending to one side of the back plate. The thermal insulating element is connected between the back plate and the thermal conductive element.

In one embodiment, at least one of a gap and a thermal insulating material exists between the extension portion of the thermal conductive element and the back plate.

In one embodiment, the base portion forms an angle with the extension portion of the thermal conductive element, or the base portion and the extension portion are substantially formed in a same plane.

According to another embodiment of the invention, an edge-lighting type backlight module includes a light guide plate, a light source module, and a back plate. The light guide plate has a light-emitting surface, a bottom surface opposite the light-emitting surface, and at least one side surface connected between the light-emitting surface and the bottom surface. The light source module is disposed adjacent to the side surface. The back plate has a first part adjacent to the bottom surface of the light guide plate, a second part touching the light source module and forming an angle with the first part, and a thermal insulating part connected between the first part and the second part.

In summary, the embodiment or embodiments of the invention may have at least one of the following advantages:

Since the heat generated by the light source module and removed by the thermal conductive element or the second part of the back plate is not conducted to the main body of the back plate, the back plate may not twist or deform as a result of a thermal stress due to non-uniform temperature distribution. This allows for good optical performance for a backlight module. In addition, since the heat is transferred by the thermal conductive element or the second part of the back plate instead of a total back plate, the main body of the back plate may not need to be made of a high-thermal-conductivity material, so as to reduce the fabrication costs.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
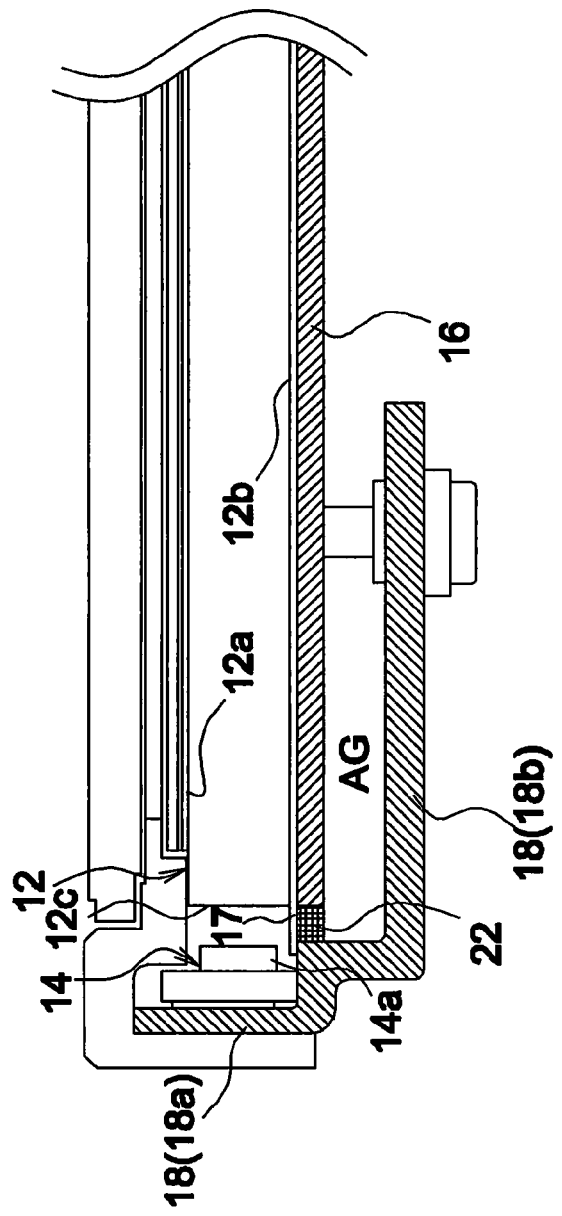
FIG. 1 shows a schematic diagram of an edge-lighting type backlight module according to an embodiment of the invention.

Referring to FIG. 1, the edge-lighting type backlight module 10 includes a light guide plate 12, a light source module 14, a back plate 16, a reflective sheet 17, a thermal conductive element 18, and a thermal insulating element 22. The light guide plate 12 has a light-emitting surface 12a, a bottom surface 12b opposite the light-emitting surface 12a, and at least one side surface 12c connected between the light-emitting surface 12a and the bottom surface 12b. The light source module 14 is disposed adjacent to the side surface 12c and may include a light-emitting diode (LED) light bar 14a. The reflective sheet 17 is disposed immediately below the bottom surface 12b. The back plate 16 is disposed adjacent to the bottom surface 12b and supports the reflective sheet 17. The thermal conductive element 18 touches the light source module 14 to dissipate the heat from the light source module 14 to the atmosphere. In this embodiment, the thermal conductive element 18 has a base portion 18a touching the light source module 14 and an extension portion 18b extending to a bottom side of the back plate 16. The extension portion 18b may allow to provide more heat-dissipating areas to enhance the heat-dissipating capability of the thermal conductive element 18. The extension portion 18b and the light guide plate 12 are respectively disposed on two sides of the back plate 16, and the base portion 18a forms an angle with the extension portion 18b of the thermal conductive element 18. The thermal insulating element 22 having low thermal conductivity is connected between the back plate 16 and the thermal conductive element 18 to reduce heat conduction between the light source module 14 and the back plate 16. Hence, the heat generated by the light source module 14 and removed by the thermal conductive element 18, the heat is not conducted to the back plate 16 through the thermal conductive element 18, and thus the back plate 16 may not twist or deform as a result of a thermal stress due to non-uniform temperature distribution. This allows for good optical performance for a backlight module. In addition, according to this embodiment, since the heat is transferred by a thermal conductive element 18 instead of a total back plate 16, the back plate 16 may not need to be made of a high-thermal-conductivity material to reduce fabrication costs.

Further, as shown in FIG. 1, in one embodiment, a gap AG exists between the extension portion 18b of the thermal conductive element 18 and the back plate 16 to reduce heat conduction. Besides, in case a plurality of contact points are formed between the back plate 16 and the thermal conductive element 18, the thermal insulating element 22 may be inserted in each of the contact points and in contact with the back plate 16 and the thermal conductive element 18 to provide well thermal insulation.

Figure 2:
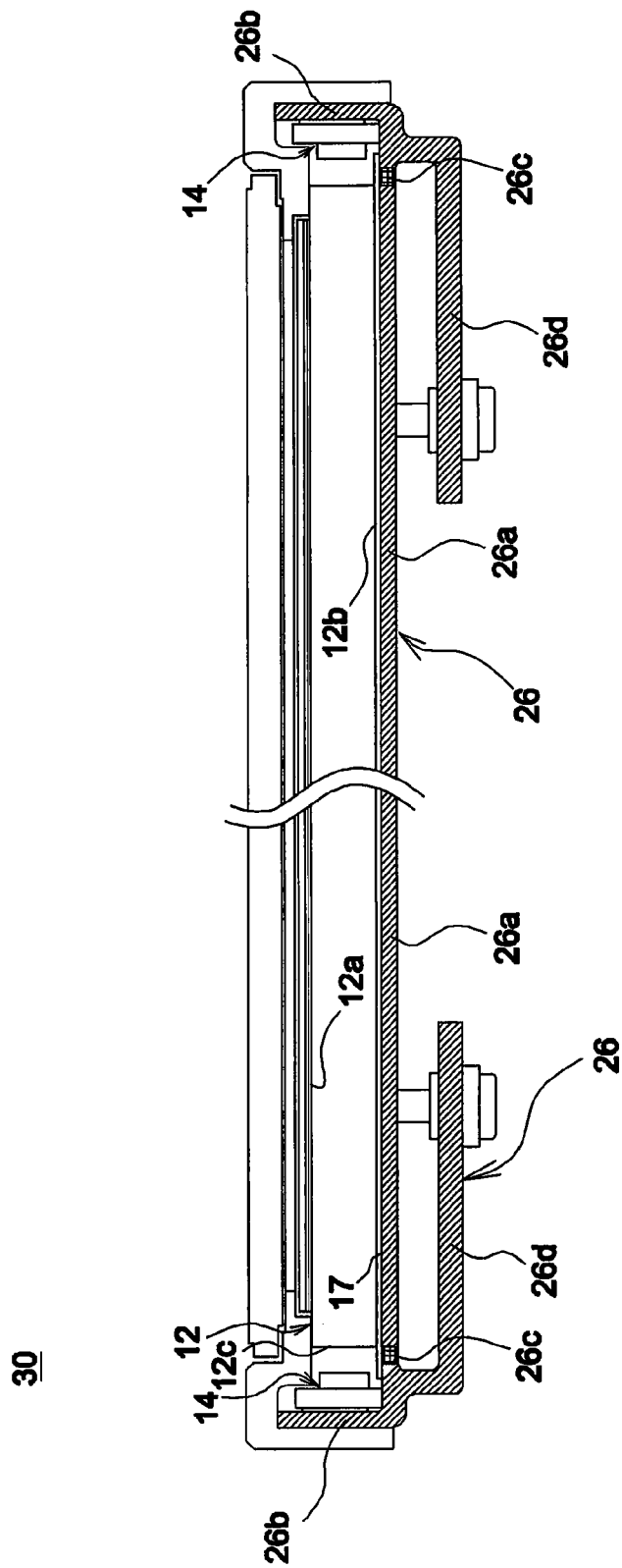
FIG. 2 shows a schematic diagram of an edge-lighting type backlight module according to another embodiment of the invention.

Referring to FIG. 2, a back plate 26 of the edge-lighting type backlight module 30 has a first part 26a adjacent to a bottom surface 12b of the light guide plate 12, a second part 26b touching the light source module 14 and forming an angle with the first part 26a, and a thermal insulating part 26c connected between the first part 26a and the second part 26b. A reflective sheet 17 is disposed immediately below the bottom surface 12b. The back plate 26 is disposed adjacent to the bottom surface 12b and supports the reflective sheet 17. The first part 26a supports the reflective sheet 17. Further, the back plate 26 may have an extension part 26d to enhance dissipation effect. The extension part 26d is connected to the second part 26b and extends to one side of the first part 26a, and the extension part 26d is not in contact with the first part 26a. The second part 26b of the back plate 26 touches the light source module 14 to dissipate heat from the light source module 14 to the atmosphere. The thermal insulating part 26c has low thermal conductivity and is disposed between the first part 26a and the second part 26b of the back plate 26 to reduce heat conduction between the light source module 14 and the first part 26a of the back plate 26. As a result, the main body of the back plate 26 may not twist or deform due to non-uniform temperature distribution. In this embodiment, the thermal conductive element 18 shown in FIG. 1 is omitted because the back plate 26 has an extension part 26d. Further, the number of the light source module 14 is not limited. For example, as shown in FIG. 2, two light source modules 14 are respectively disposed on two opposite sides of the light guide plate 12.

Figure 3:
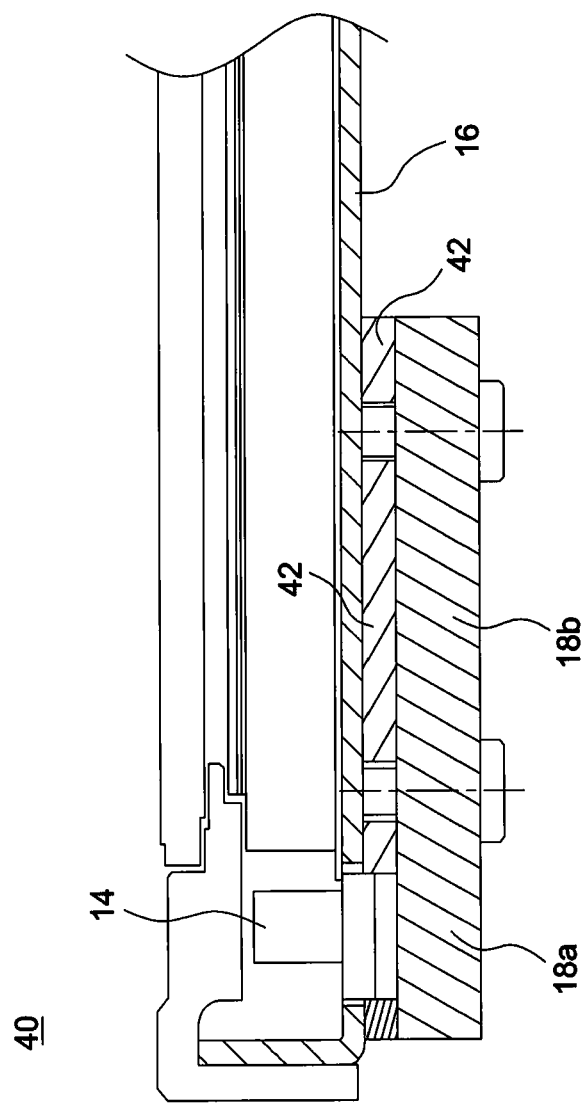
FIG. 3 shows a schematic diagram of an edge-lighting type backlight module according to another embodiment of the invention.
Figure 4:
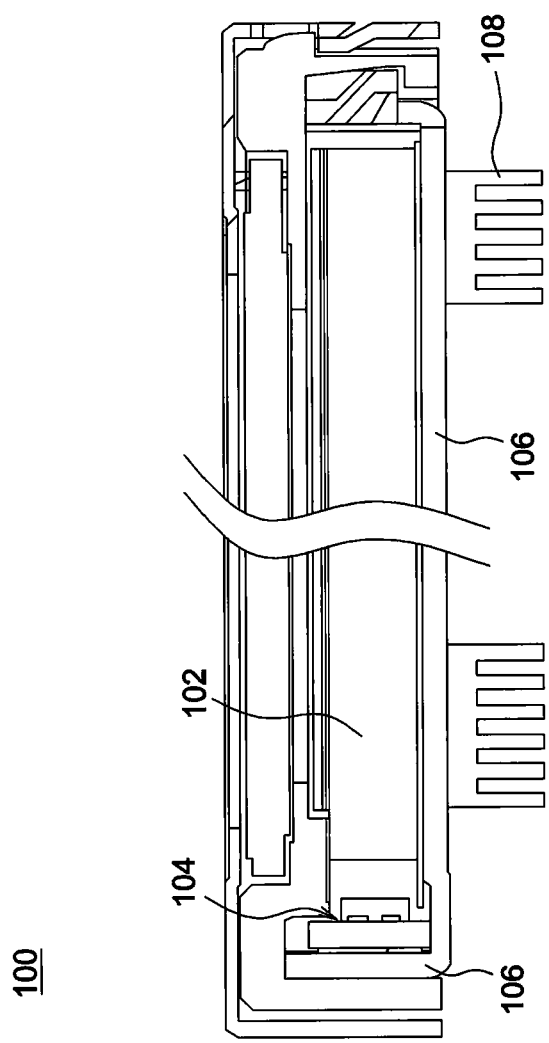
FIG. 4 shows a schematic diagram of a conventional edge-lighting type backlight module.

In an edge-lighting type backlight module 40 shown in FIG. 3, a base portion 18a and an extension portion 18b of the thermal conductive element 18 are substantially formed in a same plane, wherein the base portion 18a touches a bottom surface of the light source module 14, and the extension portion 18b extends to one side of the back plate 16. Further, a thermal insulating material 42 having low thermal conductivity may exist between the extension portion 18b of the thermal conductive element 18 and the back plate 16 to similarly reduce the heat conduction between the light source module 14 and the back plate 16.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An edge-lighting type backlight module, comprising:
   a light guide plate having a light-emitting surface, a bottom surface opposite the light-emitting surface, and at least one side surface connected between light-emitting surface and the bottom surface;
   a light source module disposed adjacent to the side surface;
   a reflective sheet disposed immediately below the bottom surface;
   a back plate disposed adjacent to the bottom surface and supporting the reflective sheet;
   a thermal conductive element having a base portion touching the light source module and an extension portion extending to one side of the back plate, wherein the light source module is attached to the thermal conductive element, and the back plate is not in contact with the thermal conductive element; and
   a thermal insulating element connected between the back plate and the thermal conductive element to reduce heat conduction between the light source module and the back plate.

2. The edge-lighting type backlight module as claimed in claim 1, wherein at least one of a gap and a thermal insulating material exists between the extension portion of the thermal conductive element and the back plate.

3. The edge-lighting type backlight module as claimed in claim 1, wherein the light source module comprises at least one light-emitting diode light bar.

4. The edge-lighting type backlight module as claimed in claim 1, wherein the base portion forms an angle with the extension portion of the thermal conductive element.

5. The edge-lighting type backlight module as claimed in claim 1, wherein the base portion and the extension portion of the thermal conductive element are substantially formed in a same plane.

6. The edge-lighting type backlight module as claimed in claim 1, wherein the extension portion of the thermal conductive element and the light guide plate are respectively disposed on two sides of the back plate.

7. An edge-lighting type backlight module, comprising:
   a light guide plate having a light-emitting surface, a bottom surface opposite the light-emitting surface, and at least one side surface connected between light-emitting surface and the bottom surface;
   a reflective sheet disposed immediately below the bottom surface;
   a light source module disposed adjacent to the side surface; and
   a back plate, comprising:
      a first part adjacent to the bottom surface of the light guide plate and supporting the reflective sheet;
      a second part touching the light source module, wherein the light source module is attached to the second part of the back plate and the second part is not in contact with the first part of the back plate; and
      a thermal insulating part connected between the first part and the second part to reduce heat conduction between the light source module and the first part of the back plate.

8. The edge-lighting type backlight module as claimed in claim 7, wherein the back plate further comprises an extension part connected to the second part and extending to one side of the first part, and the extension part is not in contact with the first part.

9. The edge-lighting type backlight module as claimed in claim 8, wherein at least one of a gap and a thermal insulating material exists between the extension part and the first part.

10. The edge-lighting type backlight module as claimed in claim 7, wherein the light source module comprises at least one light-emitting diode light bar.

* * * * *